(No Model.)

A. J. LACHMAN.
PREPARING AND APPLYING CIGAR TIPS.

No. 247,769. Patented Oct. 4, 1881.

Witnesses:

Inventor:
Adolph J. Lachman,
by his Attys.,

UNITED STATES PATENT OFFICE.

ADOLPH J. LACHMAN, OF SAN FRANCISCO, CALIFORNIA.

PREPARING AND APPLYING CIGAR-TIPS.

SPECIFICATION forming part of Letters Patent No. 247,769, dated October 4, 1881.

Application filed May 28, 1881. (No model.)

*To all whom it may concern:*

Be it known that I, ADOLPH J. LACHMAN, of the city and county of San Francisco, in the State of California, have invented a new and useful Improvement in Preparing and Applying Cigar-Tips; and I do hereby declare that the following is a full, clear, and exact description of my invention, reference being had to the accompanying drawings.

My invention relates to a method of putting up or preparing cigars for the market with tips by which they are supplied to consumers in a condition for use without further preparation.

It consists in cutting off or separating the tip from the body of the cigar, either at the time of manufacture or when they are put up for the market, and then replacing the severed tip and temporarily holding it in place until the cigar is to be smoked by means of a cap or covering device which holds on the tip or severed portion, and also covers and closes the line of cut or separation between the parts, the cap or holding device being so applied that while it holds the tip in place it can be readily detached and the cut end exposed when the cigar is to be used.

By this improvement I dispense with the mode of separating or removing the tip from a cigar before smoking by the use of cutting-instruments or by the unclean mode more commonly practiced of biting or tearing off the tip, either of which as generally performed destroy or disturb the structure of the end of the cigar, while I also retain the flavor and aroma of the cigar and preserve its form and appearance in as equal a manner as where the tip is left entire.

Figure 1:
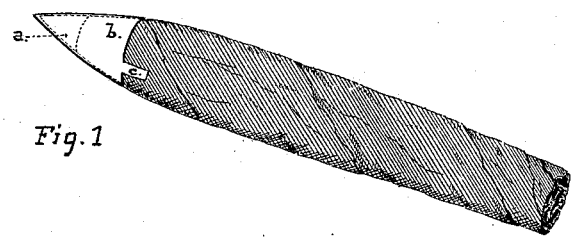
Figure 2:
Figure 3:
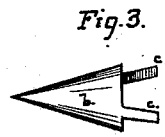

Referring to the accompanying drawings, Figure 1 is a perspective view of my improved cap. Fig. 2 is a longitudinal section, showing the parts separately. Fig. 3 is a detail view of the cap.

In preparing cigars after this method I first cut off the tips *a* by a suitable cutting machine or instrument, and then, by means of a cap or cover made of a shape to correspond with the general outline of the cigar and of a size to fit snugly over the tip and the adjacent part of the cigar-body, I hold and secure the severed portion in place again upon the end of the cigar. This holding device is for the purpose of retaining the severed tip in place and for closing the cut or line of separation between the parts, and the form in which I prefer to make it is that of a close conical cap, *b*, to receive within its apex the severed tip *a*, and when placed on the cigar to fit closely down around the end portion a sufficient distance to enable it to retain its position and to cover the line of cut or separation.

A simple and convenient mode of securing the cap in place is shown in Figs. 2 and 3 of the drawings, where an extension of the cap-body at each side forms a fastening-strip, *c*, which can be attached to the body of the cigar by the use of paste or some adhesive substance, so that while being held in place securely the cap *b* can be readily detached and removed.

By closing up and covering the cut end of the cigar in this manner I am enabled to preserve its strength, flavor, and aroma in as perfect a degree as when the tip is left entire; and by employing the severed portion to close up the end of the cut cigar I obtain a perfect and inexpensive cover for the cut end, and also insure the consumer of the genuineness and regularity of manufacture of the cigar. When the tips are thus prepared the cigars are in a condition to be packed in boxes, bundles, or otherwise put up for sale and consumption, and neither the quality, appearance, nor condition of the cigar is changed or affected for the worse.

Having thus fully described my invention, what I claim, and desire to secure by Letters Patent, is—

1. The herein-described method of preparing cigars for the market, consisting in cutting off or separating the tip from the cigar, then replacing the severed portion, and nicely fixing and temporarily securing it in place on the end of the cigar, substantially as described.

2. A cigar provided with a cut and severed tip, *a*, and a cap which are detachably fixed by means of fastening-strips on the end of the cigar-body, so as to be removed when the cigar is to be used, substantially as described.

Witness my hand and seal.

ADOLPH J. LACHMAN. [L. S.]

In presence of—
W. F. CLARK,
JNO. H. MILLER.